United States Patent
Thiele et al.

(10) Patent No.: US 12,403,768 B2
(45) Date of Patent: Sep. 2, 2025

(54) METHOD FOR OPERATING A MOTOR VEHICLE AND MOTOR VEHICLE

(71) Applicant: Volkswagen Aktiengesellschaft, Wolfsburg (DE)

(72) Inventors: Henning Thiele, Wolfsburg (DE); Wojciech Huwer, Braunschweig (DE); Anette Grüneberg, Hannover (DE); Spiro Trikaliotis, Oebisfelde-Weferlingen (DE); Olga Helwich, Leiferde (DE); Maximilian Barthel, Markkleeberg (DE); Sema Yavuz, Braunschweig (DE); Hyein Shin, Berlin (DE); Stephanie Albrecht, Wolfsburg (DE); Volkmar Wagner, Berlin (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 174 days.

(21) Appl. No.: 18/260,087

(22) PCT Filed: Jan. 18, 2022

(86) PCT No.: PCT/EP2022/050996
§ 371 (c)(1),
(2) Date: Jun. 30, 2023

(87) PCT Pub. No.: WO2022/171397
PCT Pub. Date: Aug. 18, 2022

(65) Prior Publication Data
US 2024/0059150 A1    Feb. 22, 2024

(30) Foreign Application Priority Data
Feb. 9, 2021 (DE) .................. 10 2021 201 216.7

(51) Int. Cl.
*B60K 35/10* (2024.01)
*B60K 35/21* (2024.01)

(52) U.S. Cl.
CPC ............ *B60K 35/10* (2024.01); *B60K 35/212* (2024.01); *B60K 2360/126* (2024.01)

(58) Field of Classification Search
None
See application file for complete search history.

(56) References Cited

U.S. PATENT DOCUMENTS

| 10,424,296 B2 | 9/2019 | Penilla et al. |
| 2020/0239011 A1 | 7/2020 | Hofmann et al. |

(Continued)

FOREIGN PATENT DOCUMENTS

| DE | 102004040829 A1 | 3/2006 | ......... B60R 16/037 |
| DE | 102013005085 A1 | 9/2013 | ......... B60R 16/037 |

(Continued)

OTHER PUBLICATIONS

German Office Action, Application No. 102021201216.7, 6 pages.
International Search Report and Written Opinion, Application No. PCT/EP2022/050996, 15 pages.

*Primary Examiner* — Justin S Lee
(74) *Attorney, Agent, or Firm* — Slayden Grubert Beard PLLC

(57) ABSTRACT

The disclosure relates to a method for operating a motor vehicle, in which an operating device is used to receive a user input that characterizes a selection of an ambient mode to be set from multiple predefined ambient modes, and in which a control apparatus is used to trigger the setting of a group of settings, represented by the selected ambient mode, in vehicle components of the motor vehicle that are predefined by the selected ambient mode, that are to be set, and that each provide a comfort function.

16 Claims, 2 Drawing Sheets

(56) References Cited

U.S. PATENT DOCUMENTS

2021/0162866 A1* 6/2021 Alu ........................ B60K 35/00
2021/0333806 A1* 10/2021 Urbanec ................ B64D 43/00

FOREIGN PATENT DOCUMENTS

| DE | 102014216168 A1 | 2/2016 | ............ B60R 16/02 |
|----|-----------------|--------|----------------------|
| DE | 102016213327 A1 | 1/2018 | ............ B60R 16/02 |
| DE | 102018207849 A1 | 11/2019 | ............ B60H 3/00 |
| DE | 102018113140 A1 | 12/2019 | ............ B60R 16/02 |
| DE | 102018212298 A1 | 1/2020 | ............ B60W 50/08 |
| DE | 102021201216 A1 | 8/2022 | ............ B60R 16/02 |
| KR | 20170138503 A * | 12/2017 | |
| WO | 2022/171397 A1 | 8/2022 | ............ B60K 37/06 |

* cited by examiner

METHOD FOR OPERATING A MOTOR VEHICLE AND MOTOR VEHICLE

CROSS-REFERENCE TO RELATED APPLICATIONS

This application claims priority to German Patent Application No. DE 10 2021 201 216.7, filed Feb. 9, 2021 with the German Patent and Trademark Office. The contents of the aforesaid Patent Application are incorporated herein for all purposes.

TECHNICAL FIELD

The invention relates to a method for operating a motor vehicle and to a motor vehicle.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

A method for communication between a vehicle user and a vehicle is known from DE 10 2018 113 140 A1. Moreover, a method for personalized configuration of a driving behavior of a motor vehicle is known from DE 10 2018 212 298 A1.

SUMMARY

A need exists to provide a solution that enables functions of a motor vehicle to be set in a particularly easy and targeted manner.

The need is addressed by the subject matter of the independent claims. Embodiments of the invention are disclosed in the dependent claims, the description, and the FIGS.

DESCRIPTION

Figure 1:
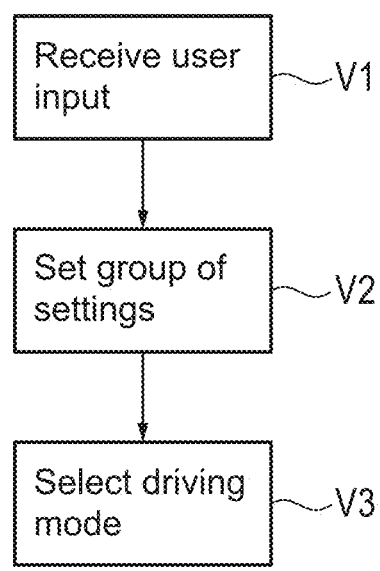
FIG. 1 shows a method diagram for an example method for operating a motor vehicle, in which in a first step an ambient mode to be set is selected, in a second step the selected ambient mode is set in the motor vehicle, and in a third, optional step a driving mode is set depending on the selected ambient mode.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

The teachings herein relate to a method for operating a motor vehicle, in which an operating device is used to receive a user input that characterizes a selection of an ambient mode to be set from multiple predefined ambient modes. The method also provides that a control apparatus is used to trigger the setting of a group of settings, represented by the selected ambient mode, in vehicle components of the motor vehicle that are predefined by the selected ambient mode, that are to be set, and that each provide a comfort function. This means that the motor vehicle comprises the operating device, the control apparatus, and the multiple vehicle components, by means of which the method can be executed. Each of the predefined ambient modes can predefine respective macro-commands, wherein each macro-command represents the assigned group of predefined settings for the respective vehicle components of the motor vehicle. It is thus provided that a setting predefined by the selected ambient mode is provided for each comfort function defined by the selected ambient mode. The method thus enables multiple comfort functions to be set together in a targeted manner by selecting the ambient mode from the multiple predefined ambient modes. This allows a particularly large number of different vehicle components, each providing a comfort function, to be set and adjusted by one person particularly easily, and in particular using a particularly small number of user inputs. The described method enables the settings of vehicle components represented by the respective ambient modes to be adjusted together by selecting one of the ambient modes.

In contrast to this, in DE 10 2018 113 140 A1 it is provided that the output data, which can be used to control individual comfort functions, can be determined from the input data, which can contain natural language instructions, depending on the vehicle user profile. In this case, it is not provided that ambient modes are predefined that each predefine a group of settings for vehicle components. Moreover, predefined driving modes, depending on which a climate control system can be throttled, are known from DE 10 2018 212 298 A1. This therefore results in a method in which a driving mode is selected and a climate control system is adjusted depending on the set driving mode. Setting multiple vehicle components, each of which provide respective comfort functions, together and independently of a driving mode, which allows the person to set the comfort functions at the same time particularly easily, is not evident at least in the above-mentioned prior art.

In some embodiments, it is provided that the selected ambient mode is set by means of the control apparatus independently of an already set driving mode. This means that the driving mode already set in the motor vehicle has no influence on the settings that are provided depending on the chosen ambient mode and that are to be set in the vehicle components. A person can thus activate the comfort functions separately from the driving mode by selecting the ambient mode. This allows a driving behavior set depending on the selected driving mode and the respective comfort functions set depending on the selected ambient mode to be adjusted particularly well to the wishes of the person, in particular of vehicle occupants of the motor vehicle.

In some embodiments, it is provided that a driving mode is selected from multiple predefined driving modes and set by means of the control apparatus depending on the selected ambient mode, which driving mode predefines a group of settings for vehicle components that each provide a driving function. This means that the driving mode set in the motor vehicle follows the selected ambient mode. In this case, an assignment rule that specifies which predefined driving mode is to be set in the respective selected ambient mode can be saved in the control apparatus. A person can thus use the operating device to select the ambient mode, wherein the driving behavior predefined by the vehicle components providing the driving function is adjusted to the selected ambient mode. This can bring the comfort functions predefined by the selected ambient mode in harmony with the driving behavior of the motor vehicle predefined by the driving mode, wherein the driving behavior is predefined by the selected ambient mode.

In some embodiments, it is provided that the user input is received by means of an operating device designed as a control dial. This operating device comprises a screen apparatus, a ring element surrounding the screen apparatus in an annular manner, and a base element, relative to which the ring element can be rotated about the axis of rotation. By rotating the ring element about the axis of rotation between rotational positions predefined for the ring element, the operating device can receive the user input, which characterizes the selection of the ambient mode from the multiple predefined ambient modes. Alternatively or additionally, the screen apparatus can have a touch-sensitive surface, through which the user input can be detected when the person touches the touch-sensitive surface. The operating device thus comprises particularly few elements and also enables the multiple settings for the vehicle components predefined by the selected ambient mode to be predefined by the user input, depending on which the ambient mode is selected from the multiple predefined ambient modes. This enables the comfort functions to be set particularly easily and, due to the control dial, intuitively.

In some embodiments, it is provided that displaying the set ambient mode by an output apparatus is triggered by means of the control apparatus. The output apparatus can be the screen apparatus of the operating device or a display in the vehicle interior of the motor vehicle. The output apparatus can visually and/or audibly output information characterizing the set ambient mode. Through the output apparatus, the person, in particular at least one vehicle occupant of the motor vehicle, can be informed particularly easily about the selected and set ambient mode.

In some embodiments, it is provided that at least one setting of at least one vehicle component characterized by the selected ambient mode is adjusted depending on at least one additional user input. Through the at least one additional user input, the person can thus adjust in a personalized manner and thereby personalize the at least one setting of the at least one vehicle component in the set ambient mode. The method thus enables the person to trigger the setting of the predefined group of settings in the vehicle components characterized by the selected ambient mode by selecting the ambient mode via the first user input, and, in addition, to adjust at least one of the settings of at least one of the vehicle components via the at least one additional, second user input. This enables the respective settings of the vehicle components to be adjusted particularly easily to needs of the person. Through the selected ambient mode, a rough presetting of the vehicle components characterized by the selected ambient mode can thus take place, wherein at least one fine adjustment of at least one of the vehicle components can be triggered by the at least one second user input.

In some embodiments, it is provided that a relaxing ambient mode and/or an energizing ambient mode and/or a cheerful ambient mode and/or a focusing ambient mode are provided for selection as predefined ambient modes. The person can thus select an ambient mode from the relaxing ambient mode and/or the energizing ambient mode and/or the cheerful ambient mode and/or the focusing ambient mode to set in the motor vehicle through the user input. In doing so, the person can select the ambient mode in particular depending on a current mood of the person or, respectively, a desired mood of the person can be selected. These ambient modes that are provided for the respective possible moods of the person enable the person to adjust the respective comfort functions to their current or the desired mood particularly easily by selecting the ambient mode. In this case, the respective settings of the vehicle functions provided by the ambient modes can be provided in order to support the current mood of the person or, respectively, to trigger or, respectively, promote the desired mood represented by the selected ambient mode in the person. Providing the multiple ambient modes each representing moods enables the vehicle functions to be set easily and, due to the joint setting of the respective vehicle components assigned to the respective ambient modes, particularly quickly for respective moods in the vehicle interior of the motor vehicle.

In some embodiments, it is provided that a respective setting of multiple comfort functions of the motor vehicle including ambient light color, ambient light source, ambient light intensity, ambient light rhythm, layout of a freely combinable instrument cluster or layout of a head-up display, layout of a display of a human-machine interface, sound profile, sound balance, volume, audio playback list, system sound, transmission sound and thus a switching sound, road noise cancellation, climate control, ventilation direction, backrest angle, seat heating, seat ventilation, massage recommendation, audio playback of a vehicle seat, room scent, and oxygen content is predefined by the selected ambient mode. In particular, it is provided that the settings of at least two or more of the mentioned comfort functions are predefined by the selected ambient mode. Additional comfort functions that are not explicitly listed here can also be set depending on the selected ambient mode. Selecting the ambient mode thus enables the settings of each of a particularly large number of comfort functions, in particular the comfort functions characterized by the selected ambient mode, to be adjusted together. In doing so, the respective comfort functions of the selected ambient mode can be set in particular at least substantially simultaneously. This allows an atmosphere predefined by the respective selected ambient mode to be set in a targeted manner and, in particular, particularly quickly in the vehicle interior of the motor vehicle.

In some embodiments, it is provided that a respective setting of multiple driving functions of the motor vehicle including adaptive chassis control, steering behavior, motor, adaptive speed control, and dynamic headlights is predefined by the selected driving mode. The adaptive chassis control can also be referred to as what is known as dynamic chassis control (DCC). The adaptive speed control can also be referred to as a distance control apparatus and what is known as adaptive cruise control (ACC). The respective set driving mode thus predefines a driving behavior for the motor vehicle. Bundling the respective driving functions in the predefined driving mode enables driving functions that are each assigned to the selected driving mode and trigger a predefined driving behavior to be assigned to the predefined ambient modes particularly easily via the assignment rule. This allows the driving behavior of the motor vehicle to be adjusted particularly easily and quickly depending on the respective selected ambient mode by selecting the driving mode. Individually assigning the respective driving functions to the predefined ambient mode can thus be omitted.

The teachings herein also relate to a motor vehicle, with an operating device, with a control apparatus, and with multiple vehicle components that can be set by the control apparatus. The motor vehicle is configured to be operated in a method as described herein. The operating device is configured to receive a user input that characterizes a selection of an ambient mode to be set from multiple predefined ambient modes. The control apparatus is configured to trigger the setting of a group of settings, represented by the selected ambient mode, in vehicle components of the motor vehicle that are predefined by the selected ambient mode, that are to be set, and that each provide a comfort function. The vehicle components are in turn configured to be controlled by the control apparatus, as a result of which the settings for the vehicle components that are predefined by the respective selected ambient mode can be set in the vehicle components. The motor vehicle enables a person to particularly easily select a respective atmosphere influenced by comfort functions based on the predefined ambient modes particularly easily, wherein the respective vehicle components can be set depending on the selected ambient mode particularly quickly by means of the control apparatus depending on the selected ambient mode. Embodiments of the method discussed herein are to be understood as embodiments of the motor vehicle discussed herein, and vice versa.

Other features can be found in the following description of the FIGS. and with reference to the drawing. The above features and combinations of features mentioned above in the description, as well as the features and combinations of features presented below in the description of the FIGS. and/or just in the FIGS. can be used not only in the indicated combination, but also in other combinations or by themselves without departing from the scope of the invention.

Reference will now be made to the drawings in which the various elements of embodiments will be given numerical designations and in which further embodiments will be discussed. Specific references to components, process steps, and other elements are not intended to be limiting. Further, it is understood that like parts bear the same or similar reference numerals when referring to alternate FIGS.

Figure 2:
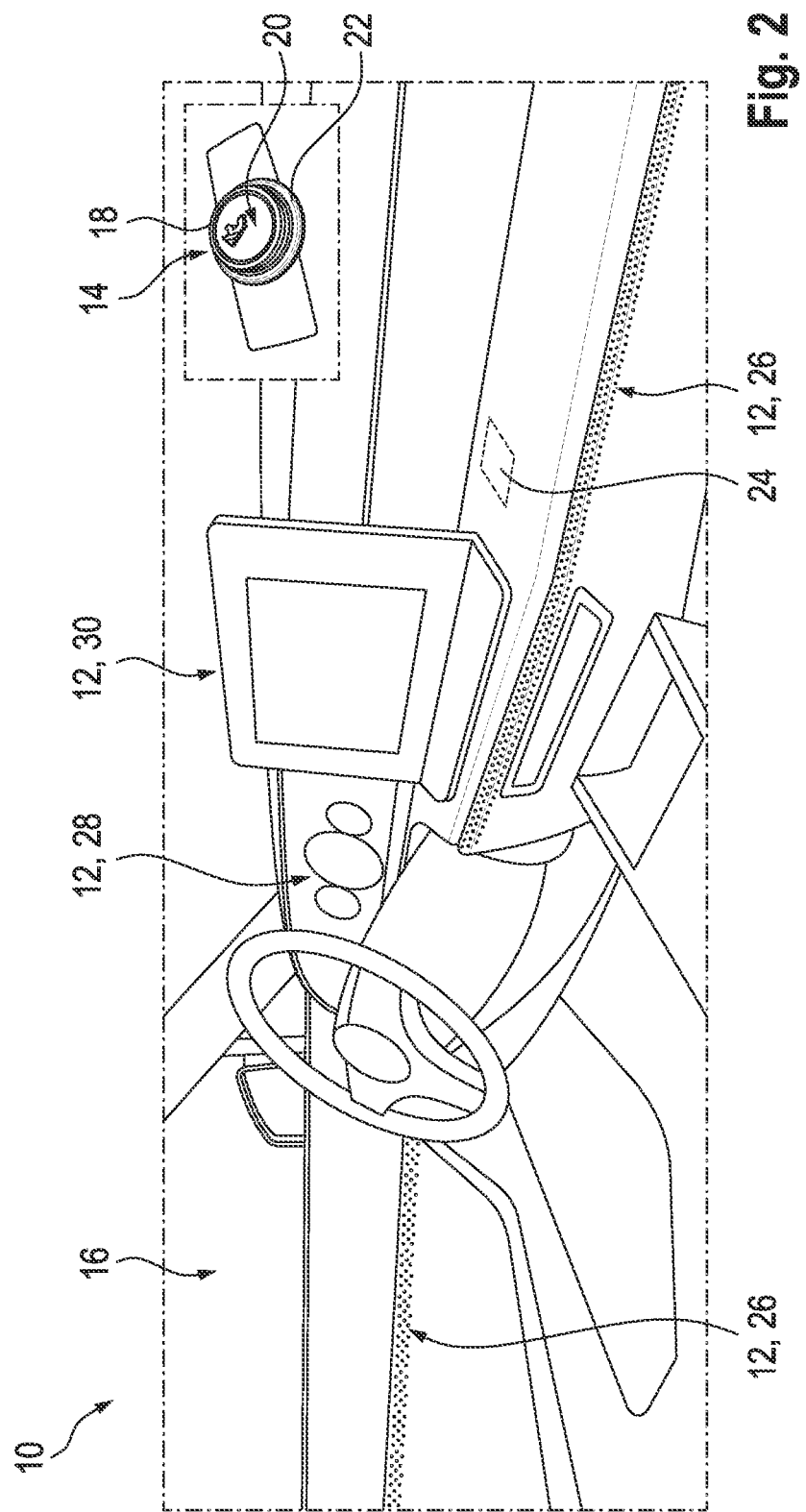
FIG. 2 shows a schematic perspective view of an example cockpit of a car with an operating device, through which the ambient mode to be set can be selected, wherein the selected ambient mode is set in the cockpit.

FIG. 1 shows a method diagram for a method for operating a motor vehicle, in the present case a car 10, in particular a passenger car. The method enables multiple vehicle components 12 of the car 10 to be set together through an operating device 14. A cockpit in a vehicle interior 16 of the car 10, which can be operated in the method shown in FIG. 1, is shown in FIG. 2. As can be seen in FIG. 2, the car 10 comprises the multiple vehicle components 12, which are each configured to provide a comfort function for vehicle occupants of the car 10. The car 10 also comprises the operating device 14, which in the present case is designed as a control dial and has a screen apparatus 20 surrounded on the periphery by a ring element 18, the ring element 18, and a base element 22. The ring element 18 can be arranged relative to the base element 22 in different rotational positions about an axis of rotation. A user input can be received by means of the operating device 14 through respective rotational positions of the ring element 18 about the axis of rotation relative to the base element 22 and/or through contact of a person with a touch-sensitive surface of the screen apparatus 20. As an alternative to providing the control dial as the operating device 14, a human-machine interface 30 can be provided in the vehicle interior 16, by means of which the user input can be received. The human-machine interface 30 can be provided in particular by an additional screen apparatus, in particular with a touch-sensitive surface.

In the method shown in FIG. 1 for operating the motor vehicle, it is provided that, in a first method step V1, the operating device 14 is used to receive a user input that characterizes a selection of an ambient mode to be set from multiple predefined ambient modes. In particular, the multiple predefined ambient modes can be saved in an electronic computing apparatus of the car 10 and made available for selection. An embodiment that is different than the embodiment of the operating device 14 shown in FIG. 2 is also possible. The user input received by means of the operating device 14 can be provided for the electronic computing apparatus of the car 10. The ambient mode to be selected characterized by the user input can be determined from the multiple predefined ambient modes by means of the electronic computing apparatus of the car 10 via an assignment rule depending on the determined user input. Each of the ambient modes saved in the electronic computing apparatus can predefine a set of settings for respective vehicle components 12 of the car 10 that are assigned to the respective predefined ambient mode and provide a respective comfort function.

The selected ambient mode determined depending on the received user input can be provided by the electronic computing apparatus for a control apparatus 24, marked schematically with a box, of the car 10. Setting the group of settings, represented by the selected ambient mode, in the respective vehicle components 12 that are predefined by the selected ambient mode and that each provide a comfort function is triggered by means of the control apparatus 24. By selecting the ambient mode from the multiple predefined ambient modes, all of the settings of the group of settings represented by the selected ambient mode can thus be predefined for the vehicle components 12 that are predefined by the selected ambient mode and that each provide a comfort function, and setting this group of settings can thus be triggered by the user input. The method therefore enables a particularly large number of vehicle components 12, in particular each of the vehicle components 12 providing at least one comfort function and assigned to the selected ambient mode, to be set particularly easily depending on the selected ambient mode.

In the method, it is provided that the comfort functions, characterized by the selected ambient mode, of the vehicle components 12 assigned to the selected ambient mode are set only depending on the selected ambient mode and thus at least substantially independently of a driving mode already set in the car 10. In an optional third method step V3, a driving mode can be selected from multiple predefined driving modes and set by means of the control apparatus 24 depending on the selected ambient mode. The driving modes each predefine a group of settings for vehicle components each providing a driving function. Here, a respective setting of multiple driving functions of the car 10 including adaptive chassis control, steering behavior, motor, adaptive speed control, and dynamic headlights can be predefined by the respective selected driving mode.

Alternatively or additionally, it can be provided in a third, optional method step V3 that at least one setting of at least one of the vehicle components 12 characterized by the selected ambient mode is set in a personalized manner by means of the control apparatus 24 depending on another user input received by means of the operating device 14. It can thus be provided that the at least one setting of the at least one vehicle component 12 characterized by the selected ambient mode is adjusted depending on the at least one additional user input. The respective comfort functions provided by the vehicle components 12 can thus be adjusted individually by means of the at least one additional user input and thus personalized.

To enable vehicle occupants to recognize the selected and set ambient mode particularly easily, it can be provided that displaying the set ambient mode by an output apparatus is triggered by means of the control apparatus 24. Here, the output apparatus can be the screen apparatus 20 of the operating device 14. Alternatively or additionally, the set or selected ambient mode can be displayed by means of a display as the output apparatus arranged in the vehicle interior 16 of the car 10.

As can be seen in FIG. 2, the vehicle components 12 can be in particular a lighting apparatus 26, an instrument cluster 28, or a human-machine interface 30. As a comfort function, an ambient light can be provided by means of the lighting apparatus 26, wherein setting an ambient light color and/or an ambient light source and/or an ambient light intensity and/or an ambient light rhythm can be provided by the selected ambient mode. As a comfort function, the freely programmable instrument cluster 28 can provide a display representing information, the layout of which can be set depending on the selected ambient mode. The human-machine interface 30 can provide a display representing information as a comfort function, wherein a layout of the display of the human-machine interface 30 can be predefined depending on the selected ambient mode. Alternatively or additionally, a respective setting of a layout of a head-up display, a sound profile, a sound balance, a volume, an audio playback list, a system sound, a transmission sound, road noise cancellation, climate control, a ventilation direction, a backrest angle, seat heating, seat ventilation, a massage recommendation, an audio playback of a vehicle seat, a room scent, and/or an oxygen content can be predefined by the respective selected ambient mode.

In particular, a relaxing ambient mode and/or an energizing ambient mode and/or a cheerful ambient mode and/or a focusing ambient mode can be made available for selection. The relaxing ambient mode can be provided in particular for long drives or enable one to catch one's breath on the way home from work. The energizing ambient mode can be provided in particular for short distances such as drives to work or to the gym. The cheerful ambient mode can be provided in particular for family trips and drives to events with friends. The focusing ambient mode can be provided in particular for driving at night or, respectively, for drives that require increased concentration.

The settings of comfort functions or, respectively, non-driving functions can be assigned to a character and can be bundled into respective macro-commands in the predefined ambient modes each representing a character. As a result, individual, personalized setting of respective comfort functions or, respectively, non-driving functions can be omitted. The method enables the ambient mode and the driving mode to be set independently of each other in the car 10.

LIST OF REFERENCE NUMERALS

10 Car
12 Vehicle component
14 Operating device
16 Vehicle interior
18 Ring element
20 Screen apparatus
22 Base element
24 Control apparatus
26 Lighting apparatus
28 Freely programmable instrument cluster
30 Human-machine interface
V1 to V3 Respective method steps The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" and "particularly" used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. A method for operating a motor vehicle, comprising:
receiving, using an operating device, a user input that selects an ambient mode to be set from multiple predefined ambient modes, which selected ambient mode comprises settings for one or more interior vehicle components of the motor vehicle;
setting, using a control apparatus, a group of settings of the one or more interior vehicle components of the motor vehicle according to the selected ambient mode; wherein the one or more vehicle components each provide a comfort function; and
selectively choosing a driving mode from multiple predefined driving modes in response to the selection of an ambient mode by the user, the driving mode being associated with the selected ambient mode, and the driving mode defining a group of settings of vehicle components that each provide a driving function.

2. The method of claim 1, wherein the group of settings is set independently of an already set driving mode.

3. The method of claim 1, wherein the user input is received from an operating device configured as a control dial, with a screen apparatus, a ring element surrounding the screen apparatus in an annular manner, and a base element, relative to which the ring element can be rotated about an axis of rotation.

4. The method of claim 1, comprising displaying the set ambient mode by an output apparatus to the user.

5. The method of claim 1, comprising adjusting, based on at least one additional user input, at least one setting of at least one vehicle component comprised in the ambient mode, selected by the user.

6. The method of claim 1, comprising providing one or more of a relaxing ambient mode, an energizing ambient mode, a cheerful ambient mode, and a focusing ambient mode for selection as predefined ambient modes.

7. The method of claim 1, wherein the ambient mode sets multiple comfort functions of the group of comfort functions, comprising: ambient light color, ambient light source, ambient light intensity, ambient light rhythm, layout of a freely programmable instrument cluster or a head-up display, layout of a display of a human-machine interface, sound profile, sound balance, volume, audio playback list, system sound, transmission sound, road noise cancellation, climate control, ventilation direction, backrest angle, seat heating, seat ventilation, massage recommendation, audio playback of a vehicle seat, room scent, and oxygen content.

8. The method of claim 2, wherein the driving mode sets multiple driving functions of the group of driving functions of: adaptive chassis control, steering behavior, motor, adaptive speed control, and dynamic headlights.

9. The method of claim 2, comprising selecting and setting a driving mode from multiple predefined driving modes based on the ambient mode selected, which driving mode predefines a group of settings of vehicle components that each provide a driving function.

10. The method of claim 2, wherein the user input is received from an operating device configured as a control dial, with a screen apparatus, a ring element surrounding the screen apparatus in an annular manner, and a base element, relative to which the ring element can be rotated about an axis of rotation.

11. The method of claim 2, comprising displaying the set ambient mode by an output apparatus to the user.

12. The method of claim 3, comprising displaying the set ambient mode by an output apparatus to the user.

13. The method of claim 2, comprising adjusting, based on at least one additional user input, at least one setting of at least one vehicle component comprised in the ambient mode, selected by the user.

14. The method of claim 3, comprising adjusting, based on at least one additional user input, at least one setting of at least one vehicle component comprised in the ambient mode, selected by the user.

15. The method of claim 4, comprising adjusting, based on at least one additional user input, at least one setting of at least one vehicle component comprised in the ambient mode, selected by the user.

16. A motor vehicle with a user input interface, a control apparatus, and multiple vehicle components that provide a comfort function; wherein the user input interface is configured to receive a user input that selects an ambient mode from multiple predefined ambient modes, which selected ambient mode comprises settings for a one or more interior vehicle components of the motor vehicle; wherein the control apparatus is configured to set a group of settings of the one or more of the interior vehicle components according to the ambient mode selected by the user and the control apparatus selectively chooses a driving mode from multiple predefined driving modes in response to the selection of an ambient mode by the user, the driving mode being associated with the selected ambient mode, and the driving mode defining a group of settings of vehicle components that each provide a driving function.

* * * * *